(12) United States Patent
Ladron De Guevara

(10) Patent No.: US 7,093,898 B2
(45) Date of Patent: Aug. 22, 2006

(54) PORTABLE AIR-PRESSURE APPLYING ASSEMBLY FOR SEATS

(76) Inventor: Julio Oswaldo Ladron De Guevara, 31, ave. du President Kennedy, 93190 Livry Gargen (FR)

( * ) Notice: Subject to any disclaimer, the term of this patent is extended or adjusted under 35 U.S.C. 154(b) by 251 days.

(21) Appl. No.: 10/420,860

(22) Filed: Apr. 23, 2003

(65) Prior Publication Data

US 2004/0189070 A1 Sep. 30, 2004

(30) Foreign Application Priority Data

Mar. 28, 2003 (CA) .......................................... 2423765

(51) Int. Cl.
*A47C 7/42* (2006.01)

(52) U.S. Cl. ................. 297/284.6; 297/284.5; 297/284.9; 297/284.3; 297/452.41; 297/DIG. 6; 5/922; 5/654; 5/723

(58) Field of Classification Search ............ 5/922, 5/653, 654, 722, 723; 297/452.41, 284.3, 297/284.6, 180.1, 180.11, 180.15, 218.1
See application file for complete search history.

(56) References Cited

U.S. PATENT DOCUMENTS

| | | | | |
|---|---|---|---|---|
| 3,613,671 A | * | 10/1971 | Poor et al. .................. | 601/149 |
| 4,190,286 A | | 2/1980 | Bentley | |
| 4,518,200 A | * | 5/1985 | Armstrong ............... | 297/284.6 |
| 4,592,588 A | * | 6/1986 | Isono et al. ............... | 297/284.6 |
| 4,619,481 A | * | 10/1986 | Grudzinskas ............ | 297/284.1 |
| 4,634,179 A | * | 1/1987 | Hashimoto et al. ...... | 297/284.6 |
| 4,655,505 A | * | 4/1987 | Kashiwamura et al. .. | 297/284.6 |
| 4,707,027 A | | 11/1987 | Horvath et al. | |
| 4,840,425 A | * | 6/1989 | Noble ...................... | 297/284.1 |
| 4,864,671 A | * | 9/1989 | Evans ......................... | 5/713 |
| 4,915,124 A | * | 4/1990 | Sember, III ............... | 137/223 |
| 5,090,076 A | * | 2/1992 | Guldager ................... | 5/713 |
| 5,127,708 A | | 7/1992 | Kishi et al. | |
| 5,152,579 A | * | 10/1992 | Bishai ...................... | 297/284.6 |
| 5,189,742 A | * | 3/1993 | Schild ....................... | 5/713 |
| 5,551,107 A | | 9/1996 | Graebe | |
| 5,860,699 A | * | 1/1999 | Weeks ...................... | 297/284.6 |
| 5,967,608 A | | 10/1999 | Van Sickle | |
| 5,975,629 A | * | 11/1999 | Lorbiecki ................. | 297/200 |
| 6,074,006 A | | 6/2000 | Milosic et al. | |
| 6,088,643 A | * | 7/2000 | Long et al. ............... | 701/49 |
| 6,203,105 B1 | * | 3/2001 | Rhodes, Jr. .............. | 297/284.6 |
| 6,283,547 B1 | | 9/2001 | Bauer et al. | |
| 2002/0079726 A1 | * | 6/2002 | Garber et al. ............ | 297/284.6 |

FOREIGN PATENT DOCUMENTS

| | | |
|---|---|---|
| DE | 3334864 A | 4/1985 |
| WO | WO98/37790 | 9/1998 |

* cited by examiner

*Primary Examiner*—Peter M. Cuomo
*Assistant Examiner*—Stephen D'Adamo
(74) *Attorney, Agent, or Firm*—BCP LLP

(57) ABSTRACT

An air-pressure applying assembly for a seat, having an occupant holding portion, for selectively applying a desired pressure to the body of a seat occupant. This assembly includes an air-bag assembly, an air-pressure source, an inlet-conduit assembly, an exhaust valve assembly, and a control assembly. The air-bag assembly is removably mountable to the seat occupant holding portion. The inlet-conduit assembly is in fluid communication at one end to the air-pressure source and at another to the air-bag assembly. The exhaust valve assembly is in fluid communication at one end to the inlet conduit assembly and has an air-outlet at the other end. A control assembly is linked to the air pressure source and to the exhaust valve assembly. The control assembly is so configured as to selectively signal the air-pressure source to inflate the air bag assembly so as to apply the desired pressure to the body of the seat occupant and as to selectively signal the exhaust valve assembly to release air from the air-bag assembly.

8 Claims, 3 Drawing Sheets

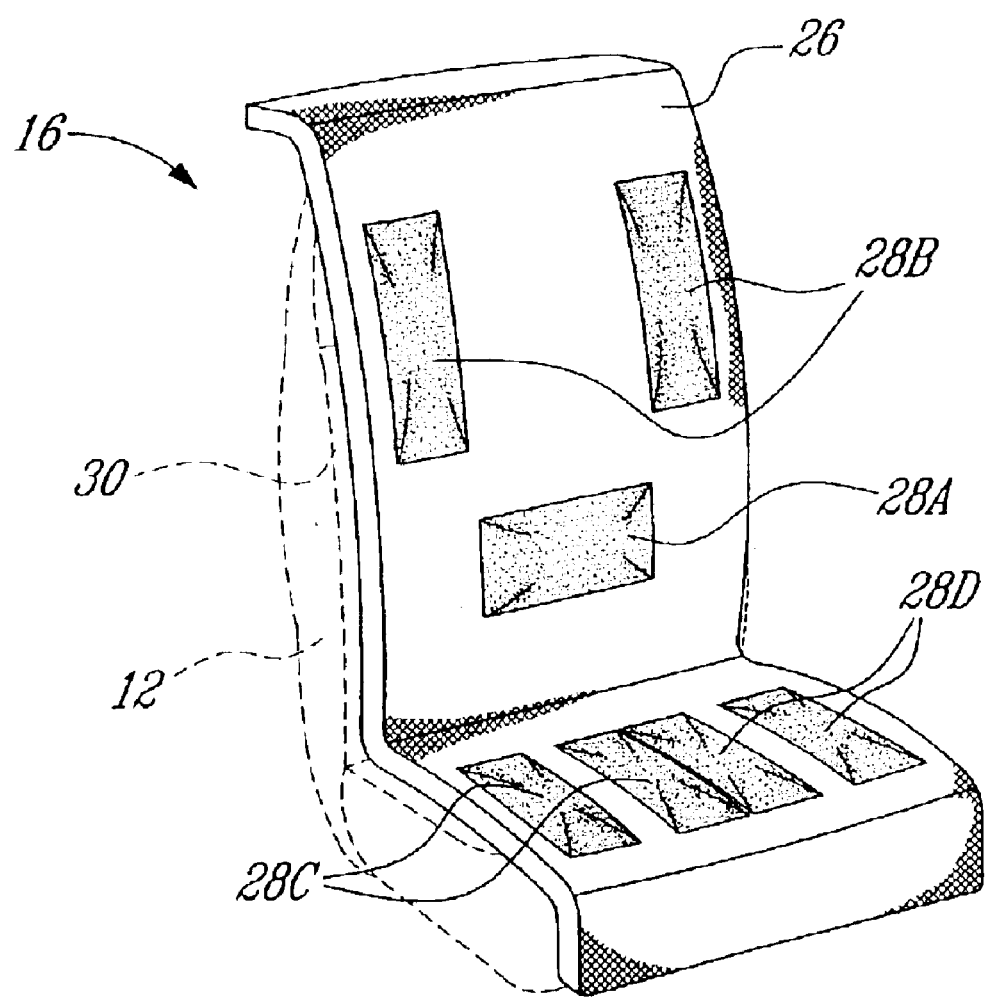
FIG_2

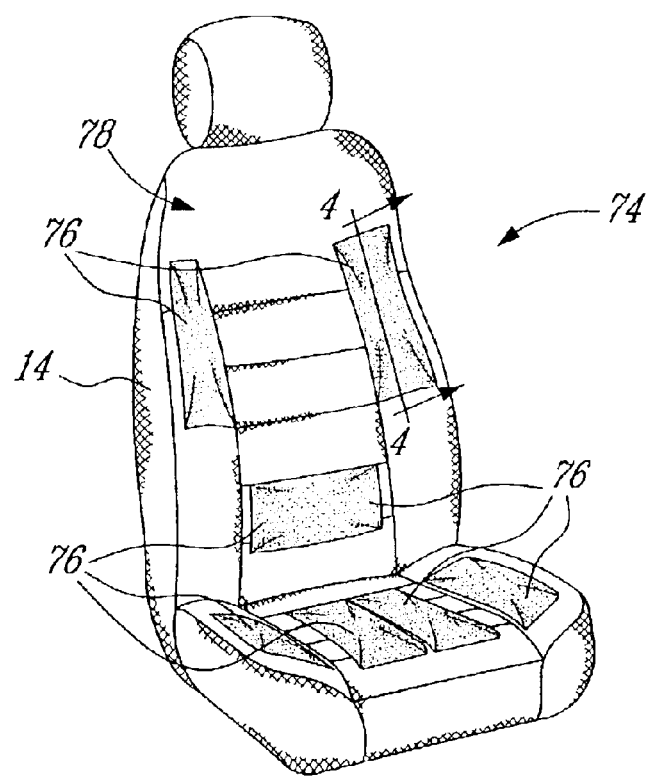
FIG_3
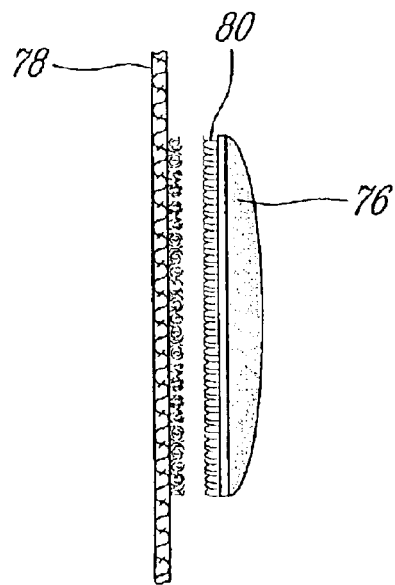
FIG_4

US 7,093,898 B2

PORTABLE AIR-PRESSURE APPLYING ASSEMBLY FOR SEATS

FIELD OF THE INVENTION

The present invention relates to an air-pressure applying assembly. More specifically, the present invention is concerned with an ergonomic, portable air pressure applying assembly that can be removably installed on a variety of seats.

BACKGROUND OF THE INVENTION

Air pressure applying systems for seats such as vehicle seats are well known.

Such systems are used to apply pressure to specific body parts in order to give the driver greater comfort. For example, seats having a pneumatic lumbar adjustment system enable the occupant to control the amount of lumbar support.

There exist in the prior art a variety of luxurious seats having a variety of air-pressure applying systems. These systems include inflatable air bags embedded within the vehicle seat. The air bags can be selectively filled with air so as to apply a desired air pressure to a specific body part corresponding to the area of the seat which includes an air bag.

A drawback of prior art air pressure applying systems for seats is that they are integral to a given seat and cannot be used for other seats as well.

OBJECTS OF THE INVENTION

The object of the present invention is therefore to provide an improved air pressure applying assembly for seats.

SUMMARY OF THE INVENTION

More specifically, in accordance with the present invention, there is provided an air-pressure applying assembly for a seat having an occupant holding portion for selectively applying a desired pressure to the body of a seat occupant, the assembly comprising:

an air-bag assembly being removably mountable to the seat occupant holding portion;

an air-pressure source;

an inlet-conduit assembly in fluid communication at one end to the air-pressure source and at another to the air-bag assembly;

an exhaust valve assembly in fluid communication at one end to the inlet conduit assembly and having an air-outlet at the other end; and a control assembly linked to the air-pressure source and to the exhaust valve assembly;

whereby, the control assembly is so configured as to selectively:
 (a) signal the air-pressure source to so inflate the air bag with air as to apply the desired pressure to the body of the seat occupant; and
 (b) signal the exhaust valve assembly to release air from the inflated air-bag assembly via the air-outlet.

In an embodiment the air-bag assembly includes at least one inflatable air-bag. In a further embodiment the air-bag includes mounting elements for being mounted to the seat. In another embodiment, the air-bag assembly includes a seat-cover member for covering at least a portion of the seat occupant portion, the seat-cover member having at least one air bag embedded therein. Alternatively, the air-bag are removable mountable on the seat-cover assembly. In yet another embodiment, the seat-cover member includes mounting elements for being mounted to the seat. In yet a further embodiment, the air bag assembly includes a plurality of air bags, the inlet conduit assembly being in fluid communication with each of these air-bags.

In one embodiment, the air-pressure source is an air pump. In another embodiment the air-pressure source is a cylinder.

In an embodiment the inlet conduit assembly includes a conduit member which includes a first and second portion. The first portion being in fluid communication with the air-pressure source. The second portion being in fluid communication with the air-bag assembly. The first and second portions being joined together in fluid communication via a union member. In another embodiment, the exhaust valve assembly is in fluid communication with this union member.

In an embodiment, the exhaust valve assembly includes a valve in fluid communication with an exhaust conduit assembly at one end thereof, the exhaust conduit being in fluid communication at another end thereof with the inlet conduit, and the valve including an air-outlet aperture.

In an embodiment, the control assembly includes a switch assembly being wired to an interrupter. The switch assembly and the interrupter are respectively wired to the air-pressure source and to the exhaust valve assembly.

An advantage of the present air-pressure applying assembly is that it is portable.

Another advantage of the present air-pressure applying assembly is that it can be adapted to a variety of seats.

The term "air bag assembly" should be construed herein to include without limitation one or a plurality of air bags or a seat cover member of various sizes and configurations including one or a plurality of air bags embedded therein and/or mounted thereon.

The term "air pressure source" may be construed herein to include a single or a plurality of air pressure sources.

The term "inlet conduit assembly" should be construed herein to include without limitation one or a plurality of conduit members in fluid communication with the same or different air sources that function to feed air to one or a plurality of air bags, and as such may or may not branch out to two or more air bags.

The term "exhaust valve assembly" may be construed to include without limitation one or more coupled exhaust conduits and valves.

Other objects, advantages and features of the present invention will become more apparent upon reading of the following non restrictive description of embodiments thereof, given by way of example only with reference to the accompanying drawings.

BRIEF DESCRIPTION OF THE DRAWINGS

In the appended drawings where like reference indicate like elements throughout and in which:

FIG. 2 is a perspective view of the air bag assembly FIG. 1 mounted to a seat;

FIG. 3 is a perspective view of an air bag assembly in accordance with another embodiment of the present invention; and FIG. 4 is a side elevational view of an air bag in accordance with an embodiment of the present invention.

DESCRIPTION OF THE EMBODIMENT

Figure 1:
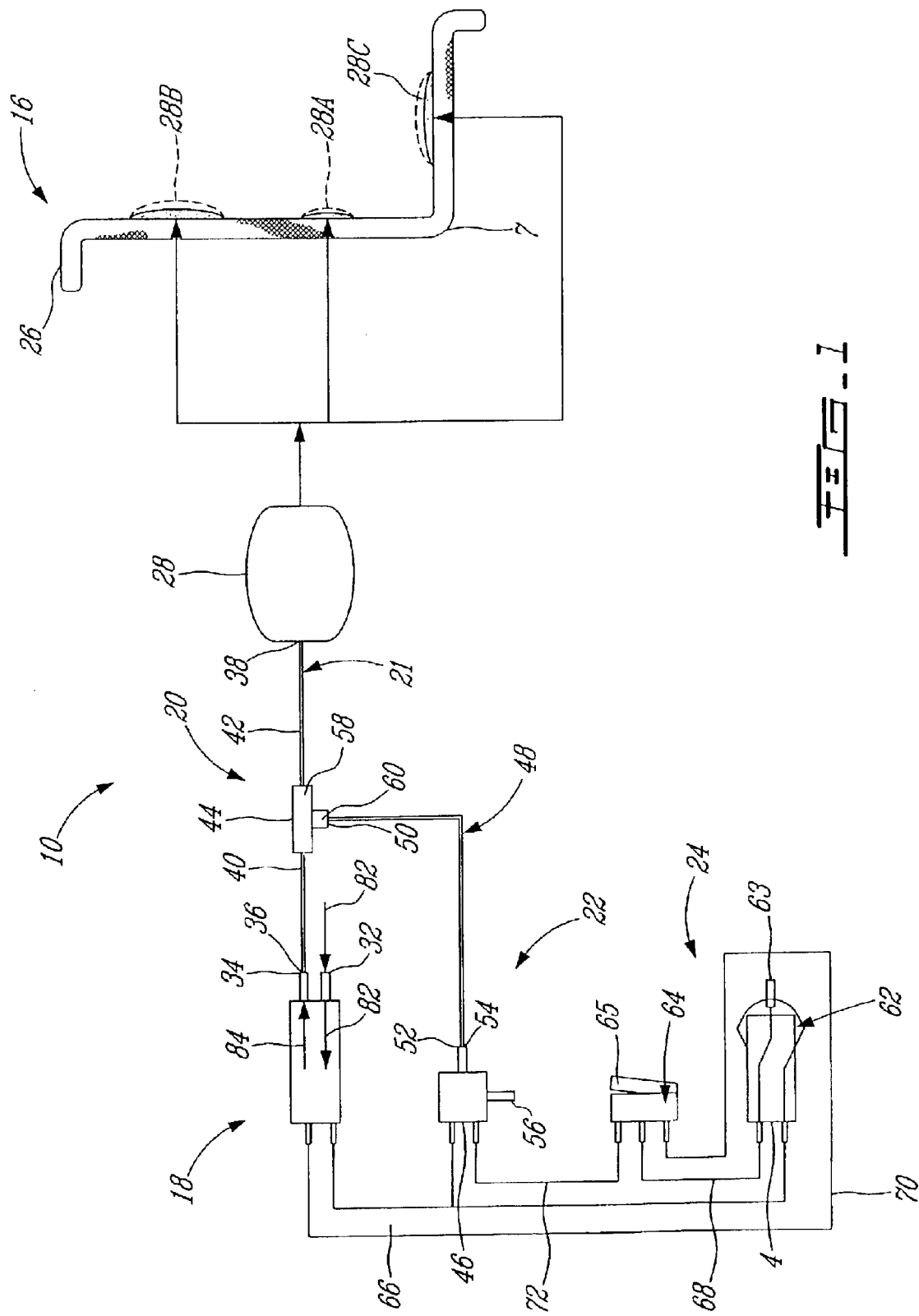
FIG. 1 is a schematic view of the present air pressure applying assembly in accordance with an embodiment of the present invention.

With respect to the accompanying drawings an embodiment of the present invention herein described:

FIG. 1 shows the pressure applying assembly 10 for a seat such as seats 12 or 14 (see FIGS. 2 and 3).

The air pressure applying assembly 10 includes an air bag assembly 16, an air pressure source 18, an inlet conduit assembly 20, an exhaust valve assembly 22, and a control assembly 24.

With reference to FIGS. 1 and 2, the air bag assembly 16 includes a seat cover 26 having a plurality of air bags 28 such as air bags 28A, 28B, 28C and 28D embedded therein. The seat cover 26 is configured mountable to the occupant holding portion 30 of a seat 12.

The air pressure source 18 is an air pump having an air inlet aperture 32 and an air conduit aperture 34 connected to the inlet conduit assembly 20 for fluid communication therewith.

The inlet conduit assembly 20 includes one conduit member 21 that has one end 36 connected to the air pressure source 18 and another end 38 connected to an air bag 28 of the air bag assembly 26. The conduit member 21 includes first and second portions 40 and 42, respectively, which are in fluid communication, via a union member 44 mounted therebetween and joining these first and second sections together.

The exhaust valve assembly 22 includes an opening and closing valve 46 and an exhaust conduit 48. The exhaust conduit 48 is connected at one end 50 thereof to the inlet conduit assembly 20 via the union member 44 for fluid communication therewith, and at another end 52 to valve 46. Valve 46 includes an exhaust conduit aperture 54 in fluid communication with the exhaust conduit 48 and an air outlet aperture 56.

The union member 44 is a two-channel member having a first channel 58 in fluid communication with the first and second portions 40 and 42 of the inlet conduit assembly 20, and a second channel 60 in fluid communication with the first channel 58 and with the exhaust conduit 48.

The control assembly includes an air feeding switch assembly 62 and an interruptor 64.

The switch assembly 62 is linked via wiring 66 to the valve 46 and the air pressure source 18 and is linked via wiring 68 to the interrupter 64. The interrupter 64 is linked to the air source 18 via wiring 70 and to the valve 46 via wiring 72. The interrupter includes a three-pole switch 65. The switch assembly 62 receives power from a power source (not shown).

In another embodiment shown in FIGS. 3 and 4, the air bag assembly 74 includes a plurality of air bags 76 that are mounted to the occupant holding portion 78 of seat 14. Air bags 76 include attaching elements 80 so as to be releasably mountable to the occupant holding portion 78 of seat 76. These elements 80 include VELCRO™.

In operation, the user actuates the switch 63 of the switch assembly 62 in order to signal the air source 18 to pump air. The air source 18 sucks in air through its inlet aperture 32 as shown by arrows 82 and will pump this air via the air conduit assembly 20 into a bag 28 as shown by arrow 84. The user fills a given bag 28 with a determined amount of air in order to apply a desired pressure to their body when seated on an a seat occupant holding portion 30.

When the air bag 28 has completely inflated, air will travel through the exhaust conduit 48 into the valve 46, which is closed. This will signal the interruptor 64 to stop the air source from pumping into the bag 28.

To release the air from the air bag, the user will turn the switch 63 of the switch assembly 62, which will signal the valve to open thus releasing air through the outlet 56 hence deflating the air bag 28.

In this way, when the user is seated on the occupant holding portion, he or she may selectively apply a desired amount of air pressure on a particular body portion corresponding to the area of the holding portion which includes an air bag.

Keeping the above description in mind, various embodiments will be herein described as a way to further exemplify the invention and not for limitation.

With particular reference to FIG. 2, bags 28 may be grouped such as the four groups of bags 28A, 28B, 28C and 28D. Hence, the air pressure source includes four pumps 18. In this case the inlet conduit assembly 20 includes four conduit members 21, each conduit member 21 branching out after the union member 44. Hence the conduit member 21 in this embodiment includes two second portions 42, one for each of the two bags of a particular group of bags 28A, 28B, 28C and 28D. Each of theses four conduit members 21 is in fluid communication with a respective exhaust-conduit 48, each of which is in fluid communication with a respective valve 46. In this case, the exhaust valve assembly 22 includes these four coupled exhaust-conduits 48 and valves 46. Each of these four valves 46 is wired to a respective interrupter 64, one for each group of bags 28A, 28B, 28C and 28D. Accordingly the switch assembly 62 includes four switch members 63, one for each of the four air pumps 18.

The air bags 28 may be provided in a variety of configurations and materials suitable for inflating and deflating and for applying desired air pressure onto the body of a seated occupant. A greater or lesser number of air bags can be used and be strategically positioned in areas to apply pressure to specific portions of the body during use.

The seat cover 26 may be provided in a variety of shapes and sizes and may include a variety of known mounting elements so as to be mounted on an occupant holding portion of a seat. The air-bags 28 need not be embedded in the seat cover 26 but they may be removably mountable on the seat-cover instead via a variety of mounting elements known in the art.

The controller assembly 24 used herein may be any known controller assembly used in the art. Hence, remote controller assemblies may also be within the context of the present invention.

The air pressure source 18 may be any type of suitable air source known to the skilled artisan such as a pump, a cylinder and the like.

The inlet conduit assembly 20 may be a single conduit member 21 mounted to one air pressure source 18 or a plurality of conduit members 21 mounted to a respective air pressure source 18 or to the same air pressure source. The conduit member 21 may be branched out to a variety of different air bags 28.

The exhaust valve assembly 20 may include one coupled exhaust conduit 48 and valve 46 or a plurality of the foregoing, one for each conduit member 21.

The seats on which the present air-pressure applying assembly is mounted to may be vehicle seats or home furniture seats, for example.

The power source used may be a battery system or a power source of a vehicle, such as a car lighter to give one example.

It is to be understood that the invention is not limited in its application to the details of construction and parts illustrated in the accompanying drawings and described hereinabove. The invention is capable of other embodiments and of being practised in various ways. It is also to be understood that the phraseology or terminology used herein is for the purpose of description and not limitation. Hence, although the present invention has been described hereinabove by way of preferred embodiments thereof, it can be modified, without departing from the spirit, scope and nature of the subject invention as defined in the appended claims.

What is claimed is:

1. An air-pressure applying assembly for a seat having a occupant holding portion for selectively applying a desired pressure to the body of a seat occupant, said assembly comprising:
    an air-bag assembly comprising a plurality of individualized and separate inflatable air-bags, each said air-bag being separately and removably mountable to the seat occupant holding portion;
    an air-pressure source;
    an inlet-conduit assembly in fluid communication at one end to said air-pressure source and at another end to each of said air-bags;
    an exhaust valve assembly in fluid communication at one end to said inlet conduit assembly and having an air-outlet at the other end; and
    a control assembly linked to said air pressure source and to said exhaust valve assembly;
    whereby, said control assembly is so configured as to selectively:
        (a) signal said air-pressure source to so inflate said air-bag assembly with air as to apply the desired pressure to the body of the seat occupant; and
        (b) signal said exhaust valve assembly to release air from said inflated air-bag assembly via air-outlet.

2. An air-pressure applying assembly according to claim 1, wherein each said air-bag includes mounting elements for being mounted to a selected area of the seat.

3. An air-pressure applying assembly according to claim 1, wherein said air-pressure source is selected from the group consisting of an air-pump and a cylinder.

4. An air-pressure applying assembly according to claim 1, wherein said exhaust valve assembly includes a valve in fluid communication with an exhaust conduit at one end thereof, said exhaust conduit being in fluid communication at another end thereof with said inlet conduit assembly, said valve including an outlet aperture.

5. An air-pressure applying assembly according to claim 1, wherein said control assembly includes a switch assembly being wired to an interrupter, said switch assembly and said interrupter being respectively wired to said air-pressure source and to said exhaust valve assembly.

6. An air-pressure applying assembly according to claim 1, wherein said inlet conduit assembly includes a conduit member.

7. An air-pressure applying assembly according to claim 6, wherein said conduit member includes a first and second portion, said first portion being in fluid communication with said air-pressure source, said second portion being in fluid communication with a given said air-bag, said first and second portions being joined together in fluid communication via a union member.

8. An air-pressure applying assembly according to claim 7, wherein said exhaust valve assembly is in fluid communication with said union member.

* * * * *